(12) United States Patent
Zhang et al.

(10) Patent No.: US 12,466,242 B2
(45) Date of Patent: Nov. 11, 2025

(54) VEHICLE WINDOW AND VEHICLE

(71) Applicant: FUYAO GLASS INDUSTRY GROUP CO., LTD., Fujian (CN)

(72) Inventors: Suming Zhang, Fujian (CN); Jianzhao Yu, Fujian (CN); Zhixin Wang, Fujian (CN)

(73) Assignee: FUYAO GLASS INDUSTRY GROUP CO., LTD., Fujian (CN)

( * ) Notice: Subject to any disclaimer, the term of this patent is extended or adjusted under 35 U.S.C. 154(b) by 107 days.

(21) Appl. No.: 18/528,226

(22) Filed: Dec. 4, 2023

(65) Prior Publication Data

US 2024/0100914 A1 Mar. 28, 2024

Related U.S. Application Data

(63) Continuation of application No. PCT/CN2022/099847, filed on Jun. 20, 2022.

(30) Foreign Application Priority Data

Jun. 22, 2021 (CN) .......................... 202110690015.5

(51) Int. Cl.
*H01Q 1/12* (2006.01)
*B60J 1/00* (2006.01)
*H01Q 1/32* (2006.01)
*B60R 11/02* (2006.01)

(52) U.S. Cl.
CPC ............... *B60J 1/008* (2013.01); *B60J 1/001* (2013.01); *B60J 1/006* (2013.01); *H01Q 1/1271* (2013.01); *H01Q 1/3275* (2013.01); *B60R 11/02* (2013.01)

(58) Field of Classification Search
CPC ....... H01Q 1/1271; H01Q 1/32; H01Q 1/3275
See application file for complete search history.

(56) References Cited

U.S. PATENT DOCUMENTS

2003/0061765 A1   4/2003   Kawata et al.
2019/0210546 A1*  7/2019   Slovesko ............ B60R 16/0231
(Continued)

FOREIGN PATENT DOCUMENTS

CN   104476855 B  *  1/2016   ............. B32B 17/06
CN   106993407 A      7/2017
CN   207631144 U      7/2018
(Continued)

OTHER PUBLICATIONS

Extended European search report dated Sep. 10, 2024 received in European Patent Application No. 22827521.0.
(Continued)

*Primary Examiner* — Hoang V Nguyen
(74) *Attorney, Agent, or Firm* — Scully, Scott, Murphy & Presser, P.C.

(57) ABSTRACT

A vehicle window and a vehicle are provided. The vehicle window includes a first light-transmitting plate, a second plate, and an injection-mold connector. The second plate spaced apart from the first light-transmitting plate to define a gap. The second plate defines a mounting hole. The mounting hole is configured to accommodate a vehicle-mounted antenna. The injection-molded connector is disposed in the gap, and fixedly connected between the first light-transmitting plate and the second plate.

20 Claims, 8 Drawing Sheets

(56) References Cited

U.S. PATENT DOCUMENTS

2020/0391577 A1  12/2020  Bard et al.
2021/0163345 A1   6/2021  Bronstein et al.

FOREIGN PATENT DOCUMENTS

| CN | 207875360 U | 9/2018 | |
| CN | 108945109 A | 12/2018 | |
| CN | 209126665 U | 7/2019 | |
| CN | 211139463 U | 7/2020 | |
| CN | 211764831 U | 10/2020 | |
| CN | 111987409 A | 11/2020 | |
| JP | 2005041358 A | 2/2005 | |
| JP | 2007001353 A | 1/2007 | |
| JP | 2009274608 A | 11/2009 | |
| WO | WO-2018178882 A1 * | 10/2018 | ....... B32B 17/10036 |

OTHER PUBLICATIONS

International Search Report dated Aug. 26, 2022 issued in PCT/CN2022/099847.
Notice of Allowance dated Jun. 22, 2022 issued in CN 202110690015.5.

* cited by examiner

VEHICLE WINDOW AND VEHICLE

CROSS-REFERENCE TO RELATED APPLICATION(S)

This application is a continuation of International Application No. PCT/CN2022/099847, filed Jun. 20, 2022, which claims priority to Chinese Patent Application No. 202110690015.5, filed Jun. 22, 2021, the entire disclosures of which are incorporated herein by reference.

TECHNICAL FIELD

This disclosure relates to the field of vehicle technology, and in particular to a vehicle window and a vehicle.

BACKGROUND

Due to vehicle sunroofs mounted on vehicle roofs, air in the vehicle can be effectively circulated, which facilitates introduction of fresh air. Meanwhile, the vehicle sunroof can broaden a field of view to satisfy shooting requirements of photography and videography when moving. Common vehicle sunroofs include manual sunroofs, outer sliding sunroofs, built-in sunroofs, panoramic sunroofs, multifunctional sunroofs, and other types.

With upgrading of vehicle consumption and development of integrated technology, the vehicle sunroofs become more and more popular in low-end models, and integration of accessories becomes higher and higher. In an existing vehicle sunroof, usually an outer bracket of a vehicle body defines a hole, through which a vehicle-mounted antenna transmits signals to a device in the vehicle. However, a manufacturing process of the outer bracket of the vehicle body is complex, and the outer bracket of the vehicle body is greatly different from a sunroof glass in appearance and color, so that a full glass appearance effect of the vehicle sunroof cannot be realized.

Therefore, how to design a vehicle window and a vehicle that can reduce a manufacturing difficulty and realize a panoramic sunroof appearance effect becomes an urgent problem to be solved.

SUMMARY

In one aspect, a vehicle window is provided in the present disclosure. The vehicle window includes a first light-transmitting plate, a second plate, and an injection-molded connector. The second plate is spaced apart from the first light-transmitting plate to define a gap. The second plate defines a mounting hole. The mounting hole is configured to accommodate a vehicle-mounted antenna. The injection-molded connector is disposed in the gap, and is fixedly connected between the first light-transmitting plate and the second plate.

In another aspect, a vehicle is further provided in the present disclosure. The vehicle includes a vehicle window. The vehicle window includes a first light-transmitting plate, a second plate, and an injection-molded connector. The second plate is spaced apart from the first light-transmitting plate to define a gap. The second plate defines a mounting hole. The mounting hole is configured to accommodate a vehicle-mounted antenna. The injection-molded connector is disposed in the gap, and is fixedly connected between the first light-transmitting plate and the second plate. The vehicle further includes a vehicle-mounted antenna, a vehicle-body bracket, and an adhesive member. The adhesive member is adhered between the vehicle window and the vehicle-body bracket. The vehicle-mounted antenna penetrates through the vehicle window, and is configured to receive a high-frequency radio wave and transmit the high-frequency radio wave received to a receiver of the vehicle, to demodulate a carrier wave.

BRIEF DESCRIPTION OF THE DRAWINGS

To describe technical solutions in embodiments of the present disclosure more clearly, the following briefly introduces the accompanying drawings required for describing the embodiments of the present disclosure.

DETAILED DESCRIPTION

Figure 1:
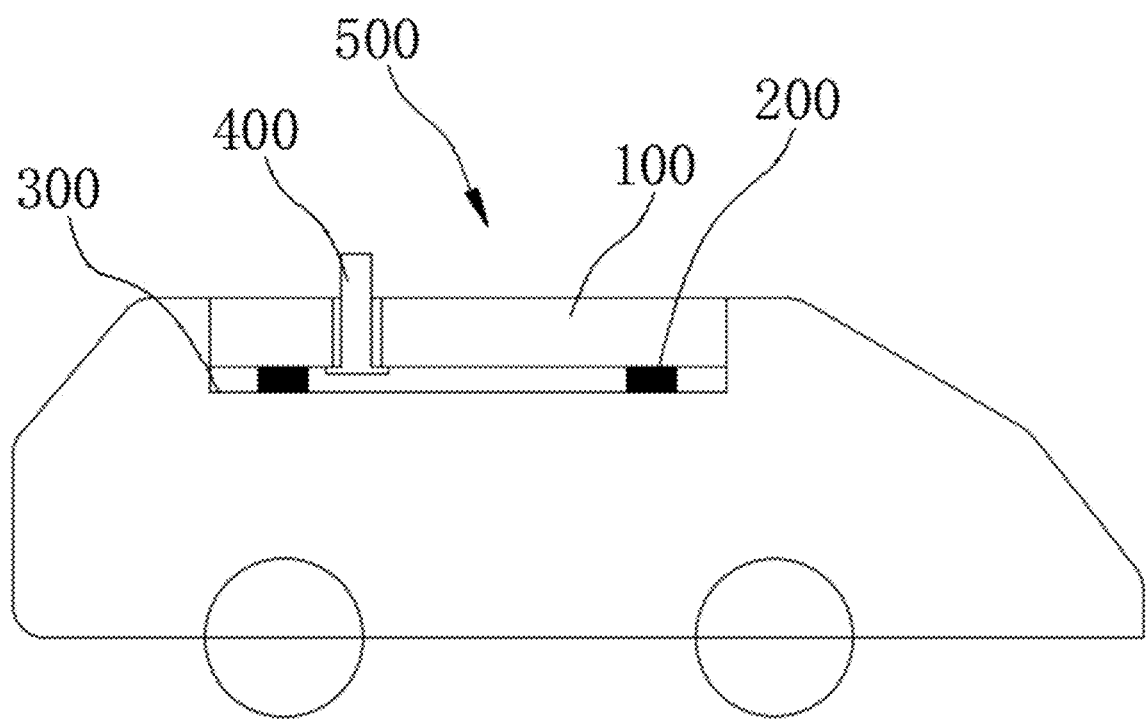
FIG. 1 is a schematic view of a vehicle provided in an embodiment of the present disclosure.

The technical solutions in embodiments of the present disclosure will be clearly and completely described below with reference to the accompanying drawings of embodiments of the present disclosure. Apparently, the embodiments described are merely some rather than all of embodiments of the present disclosure. All other embodiments obtained by those of ordinary skill in the art based on embodiments of the present disclosure without creative efforts shall fall within the scope of protection of the present disclosure.

To solve the above technical problem, a vehicle window and a vehicle that can reduce a manufacturing difficulty and realizing a panoramic sunroof appearance effect is provided in the present disclosure.

In one aspect, a vehicle window is provided in the present disclosure. The vehicle window includes a first light-transmitting plate, a second plate, and an injection-molded connector. The second plate is spaced apart from the first light-transmitting plate to define a gap. The second plate defines a mounting hole. The mounting hole is configured to accommodate a vehicle-mounted antenna. The injection-molded connector is disposed in the gap, and is fixedly connected between the first light-transmitting plate and the second plate.

In a possible implementation, the first light-transmitting plate has a first surface and a second surface opposite to the first surface. The second plate has a third surface and a fourth surface opposite to the third surface. The injection-molded connector includes a first connecting portion, a second connecting portion, and a third connecting portion that are integrally formed. The first connecting portion is disposed in the gap. The second connecting portion is fixedly connected to the second surface. The third connecting portion is fixedly connected to the fourth surface.

Further, a peripheral sidewall of the first light-transmitting plate defines an accommodating groove. The second plate is accommodated in the accommodating groove. An inner sidewall of the accommodating groove is spaced apart from the second plate to define the gap. The first connecting portion is disposed in the gap. The accommodating groove has a first opening located on the first surface, a second opening located on the second surface, and a third opening located on the peripheral sidewall of the first light-transmitting plate.

Further, the first connecting portion has an extension length greater than or equal to 1 mm in a direction from the first light-transmitting plate to the second plate. The second connecting portion has an extension length greater than or equal to 2 mm in the direction from the first light-transmitting plate to the second plate. The third connecting portion has an extension length greater than or equal to 2 mm in the direction from the first light-transmitting plate to the second plate.

Further, the second connecting portion has an extension thickness greater than or equal to 2 mm in a direction perpendicular to the first light-transmitting plate. The third connecting portion has an extension thickness greater than or equal to 2 mm in a direction perpendicular to the second plate.

In a possible implementation, the first light-transmitting plate has an extension thickness less than or equal to 5 mm in a direction perpendicular to the first light-transmitting plate.

Further, the first light-transmitting plate is laminated glass. The laminated glass includes at least two layers of light-transmitting glass and at least one intermediate film. At least one intermediate film is disposed between each two adjacent layers of light-transmitting glass in the at least two layers of light-transmitting glass.

In a possible implementation, the second plate has an extension thickness less than or equal to 5 mm in a direction perpendicular to the second plate.

Further, the second plate is a single layer of glass.

Further, the vehicle window further includes a protective sleeve fixedly penetrating through the mounting hole.

Furthermore, the protective sleeve includes a first protective portion, a second protective portion, and a third protective portion that are integrally formed. The second protective portion and the third protective portion are disposed at two opposite ends of the first protective portion respectively. The second protective portion is fixed to the third surface. The third protective portion is fixed to the fourth surface.

Furthermore, the first protective portion has an extension thickness greater than or equal to 1 mm in a direction perpendicular to an axial direction of the mounting hole. The second protective portion has an extension thickness greater than or equal to 1 mm in a radial direction of the mounting hole. The third protective portion has an extension thickness greater than or equal to 1 mm in the axial direction of the mounting hole.

In another aspect, a vehicle is further provided in the present disclosure. The vehicle includes a vehicle window. The vehicle window includes a first light-transmitting plate, a second plate, and an injection-molded connector. The second plate is spaced apart from the first light-transmitting plate to define a gap. The second plate defines a mounting hole. The mounting hole is configured to accommodate a vehicle-mounted antenna. The injection-molded connector is disposed in the gap, and is fixedly connected between the first light-transmitting plate and the second plate. The vehicle further includes a vehicle-mounted antenna, a vehicle-body bracket, and an adhesive member. The adhesive member is adhered between the vehicle window and the vehicle-body bracket. The vehicle-mounted antenna penetrates through the vehicle window, and is configured to receive a high-frequency radio wave and transmit the high-frequency radio wave received to a receiver of the vehicle, to demodulate a carrier wave.

Compared to a conventional vehicle-window structure with a metal outer plate, a metal inner plate, and laminated glass, in the present disclosure, the first light-transmitting plate and the second plate are connected by means of injection molding into a whole, which is simpler in structure, more convenient in manufacturing, lower in cost. Since the first light-transmitting plate and the second plate each have a light-transmitting property, the vehicle window realizes a panoramic effect, and user experience is better. Since the first light-transmitting plate is not suitable for defining a mounting hole for the vehicle-mounted antenna, in the present disclosure, the second plate defines the mounting hole for the vehicle-mounted antenna, an influence on an appearance effect of the first light-transmitting plate is reduced, and the vehicle-mounted antenna is more conveniently mounted on the vehicle window, so that structural optimization at a position of the vehicle-mounted is realized.

The technical solution of the present disclosure will be described below in detail by taking the application of the vehicle roof to vehicles as an example.

Referring to FIG. 1, a vehicle 500 includes a vehicle window 100, an adhesive member 200, a vehicle-body bracket 300, and a vehicle-mounted antenna 400. The adhesive member 200 is adhered between the vehicle window 100 and the vehicle-body bracket 300, so that the vehicle window 100 is fixedly connected to the vehicle-body bracket 300, thereby realizing a panoramic sunroof effect of the vehicle 500. The vehicle-mounted antenna 400 penetrates through and is fixed to the vehicle window 100, and is configured to receive a high-frequency radio wave and transmit the high-frequency radio wave received to a receiver of the vehicle 500. A carrier wave is demodulated by the vehicle-mounted antenna 400, so that the receiver inside the car 500 receives an external signal.

It can be understood that the vehicle window 100 provided in the present disclosure may be applied to, but is not limited to, other locomotives such as the vehicle 500.

In this embodiment of the present disclosure, a material of the adhesive member 200 is a white glue (i.e., a PU glue, a polyurethane resin). In other embodiments, the material of the adhesive member 200 includes, but is not limited to, other adhesive materials such as the PU glue.

Figure 2:
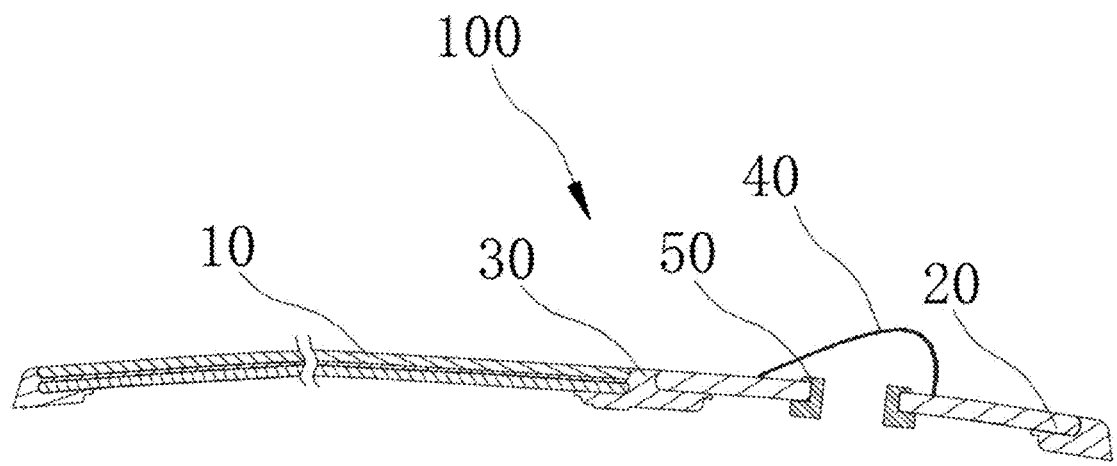
FIG. 2 is a cross-sectional view of a vehicle window provided in one embodiment of the present disclosure.

In one embodiment, as illustrated in FIG. 2, the vehicle window 100 includes a first light-transmitting plate 10, a second plate 20, an injection molded connector 30, an antenna cover 40, and a protective sleeve 50.

Figure 3:
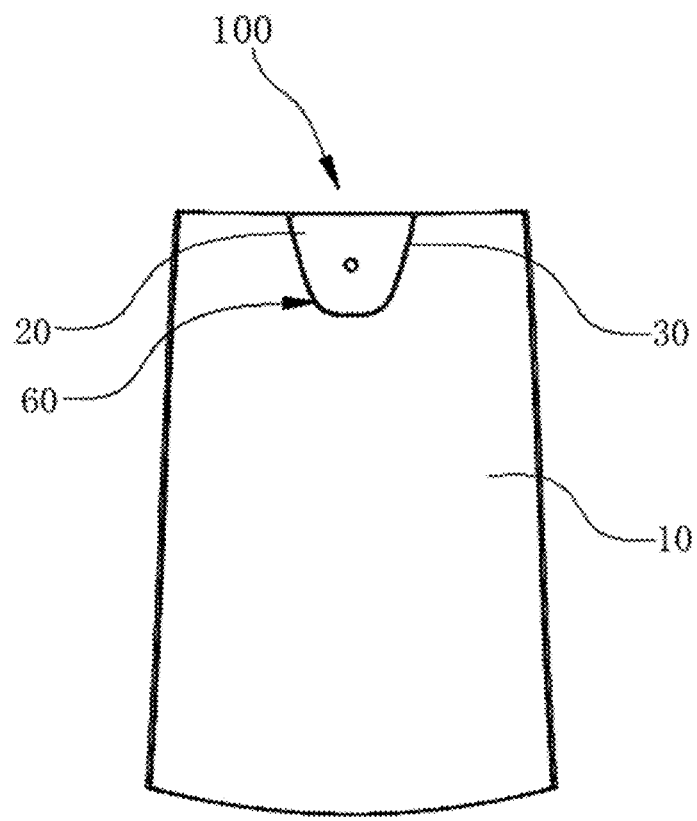
FIG. 3 is a schematic view of a vehicle window provided in an embodiment of the present disclosure.
Figure 4:
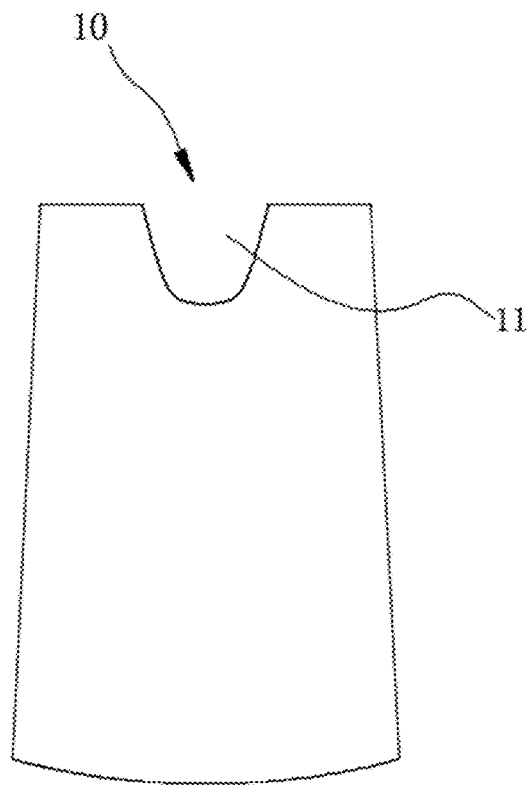
FIG. 4 is a schematic view of a first light-transmitting plate provided in an embodiment of the present disclosure.
Figure 15:
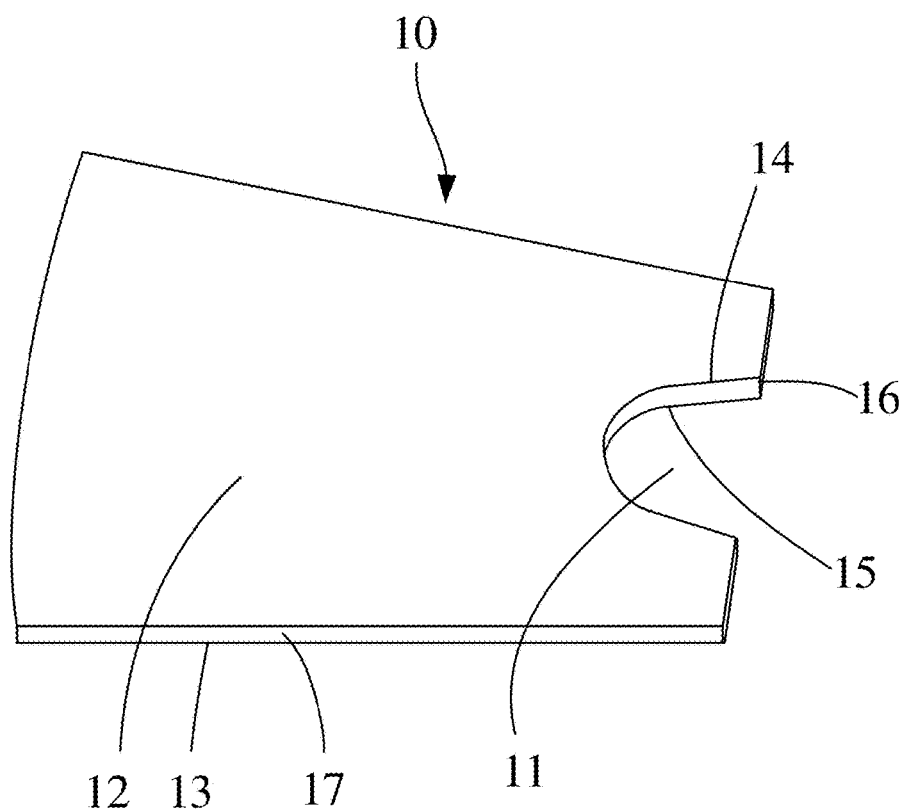
FIG. 15 is a schematic view of the first light-transmitting plate illustrated in FIG. 4 from another perspective.

Referring to FIG. 3 and FIG. 4, a peripheral sidewall 17 of the first light-transmitting plate 10 defines an accommodating groove 11. Specifically, part of the peripheral sidewall 17 of the first light-transmitting plate 10 defines the accommodating groove 11. An opening of the accommodating groove 11 is located on the peripheral sidewall 17 of the light-transmitting plate 10. The second plate 20 is accommodated in the accommodating groove 11. The second plate 20 is spaced apart from an inner sidewall (i.e., the part of the peripheral sidewall 17) of the accommodating groove 11 to define a gap 60. Referring to FIG. 15, the accommodating groove 11 has a first opening 14 located on the first surface 12, a second opening 15 located on the second surface 13, and a third opening 16 located on the peripheral sidewall 17 of the first light-transmitting plate 10.

Figure 5:
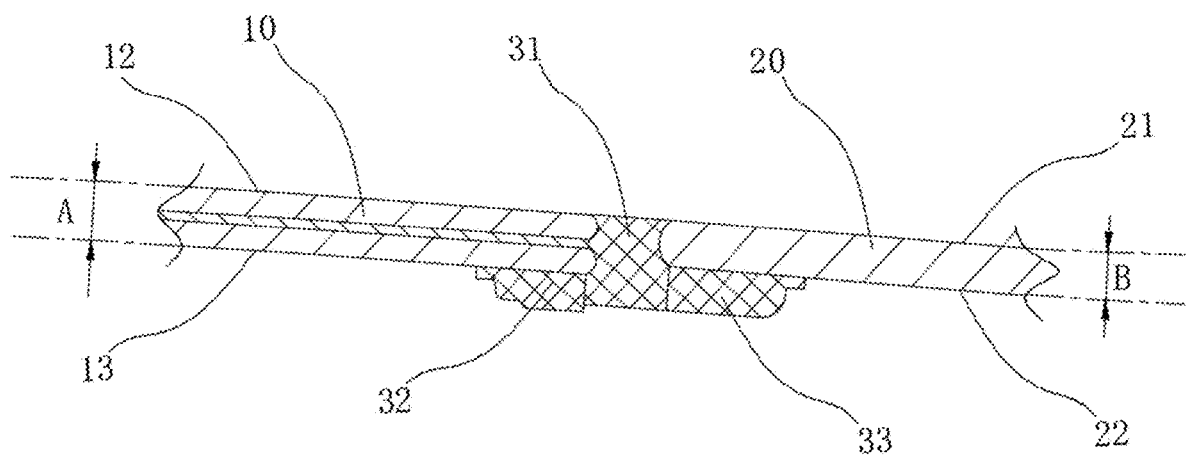
FIG. 5 is an assembly view of a first light-transmitting plate and a second plate provided in one embodiment of the present disclosure.

Referring to FIG. 1, FIG. 4, and FIG. 5, the first light-transmitting plate 10 has a first surface 12 and a second surface 13 opposite to the first surface 12. The first surface 12 faces the exterior of the vehicle 500. The second surface 13 faces the interior of the vehicle 500. The first light-transmitting plate 10 has a thickness A less than or equal to 5 mm in a direction perpendicular to the first surface 12, so that the first light-transmitting plate 10 satisfies structural strength, reduces the weight of parts, and reduces the weight of the vehicle window 100. The first light-transmitting plate 10 includes, but is not limited to, multiple layers of glass, etc. The accommodating groove 11 extends through the first surface 12 and the second surface 13.

In this embodiment of the present disclosure, the first light-transmitting plate 10 is laminated glass. The laminated glass is a composite glass product, which is formed by following operations. One or more layers of organic polymer intermediate films are sandwiched between two or more pieces of glass, and after being treated by a special high-temperature pre-pressing (or vacuum) and high-temperature high-pressure process, the glass and the intermediate film are permanently bonded into the composite glass product. It may be understood that the first light-transmitting plate 10 may also be a single layer of glass or other types of light-transmitting plates.

Figure 6:
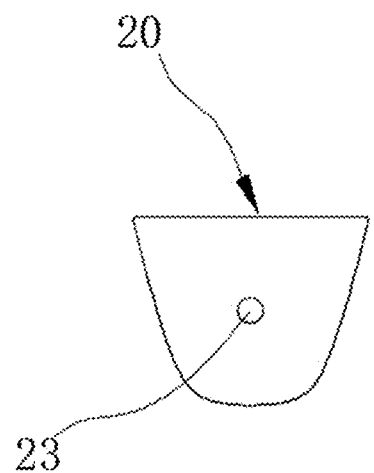
FIG. 6 is a schematic view of a second plate provided in an embodiment of the present disclosure.

Referring to FIG. 1, FIG. 5, and FIG. 6, the second plate 20 has a third surface 21 and a fourth surface 22 opposite to the third surface 21. The third surface 21 faces the exterior of the vehicle 500. The fourth surface 22 faces the interior of the vehicle 500. The second plate 20 defines a mounting hole 23 extending through the third surface 21 and the fourth surface 22. When the vehicle-mounted antenna 400 is mounted on the vehicle 500, the mounting hole 23 is configured to accommodate at least part of the vehicle-mounted antenna 400, and the vehicle-mounted antenna 400 is fixed to the second plate 20. The second plate 20 has a thickness B less than or equal to 5 mm in a direction perpendicular to the third surface 21, so that the second plate 20 satisfies structural strength, reduces the weight of parts, and reduces the weight of the vehicle window 100.

In this implementation of the present disclosure, the second plate 20 is a single layer of glass. It may be understood that the second plate 20 includes, but is not limited to, other plate materials such as a single layer of glass, a high gloss plate, etc. The single layer of glass has a light-transmitting property, and can realize the panoramic sunroof effect. An outer surface of the high gloss plate has a high gloss characteristic, and can also realize the panoramic sunroof appearance effect.

Referring to FIG. 3 and FIG. 5, the injection-molded connector 30 is disposed in the gap 60 between the second plate 20 and the sidewall of the accommodating groove 11, so that the first light-transmitting plate 10 is fixedly connected to the second plate 20 through the injection-molded connector 30 to form an integral structure.

Referring to FIG. 2 and FIG. 5, the injection-molded connector 30 is in an inverted T-shape. The injection-molded connector 30 includes a first connecting portion 31, a second connecting portion 32, and a third connecting portion 33 that are integrally formed. The second connecting portion 32 is disposed opposite to the third connecting portion 33. One end of the second connecting portion 32 close to the third connecting portion 33 is fixedly connected to the first connecting portion 31 at one side of the first connecting portion 31. One end of the third connecting portion 33 close to the second connecting portion 32 is fixedly connected to the other end of the first connecting portion 31.

The first connecting portion 31 is sandwiched and fixedly connected between the first light-transmitting plate 10 and the second plate 20, that is, the first connecting portion 31 is disposed in the gap 60, so that the first light-transmitting plate 10 and the second plate 20 are fixed in a direction in which the first light-transmitting plate 10 faces the second plate 20. The second connecting portion 32 abuts against the first light-transmitting plate 10, and the second connecting portion 32 is attached to the second surface 13 of the first light-transmitting plate 10. The first light-transmitting plate 10 is supported and fixed by the second connecting portion 32, so that the first light-transmitting plate 10 is fixed in a direction perpendicular to the first light-transmitting plate 10. The third connecting portion 33 abuts against the second plate 20, and the third connecting portion 33 is attached to the fourth surface 22 of the second plate 20. The second plate 20 is supported and fixed by the third connecting portion 33, so that the second plate 20 is fixed in a direction perpendicular to the second plate 20.

The first connecting portion 31, the second connecting portion 32, and the third connecting portion 33 are fixedly connected or integrally formed, so that a connection between the first light-transmitting plate 10 and the second plate 20 is more stable and reliable, and a structure of the vehicle window 100 is more stable.

Figure 7:
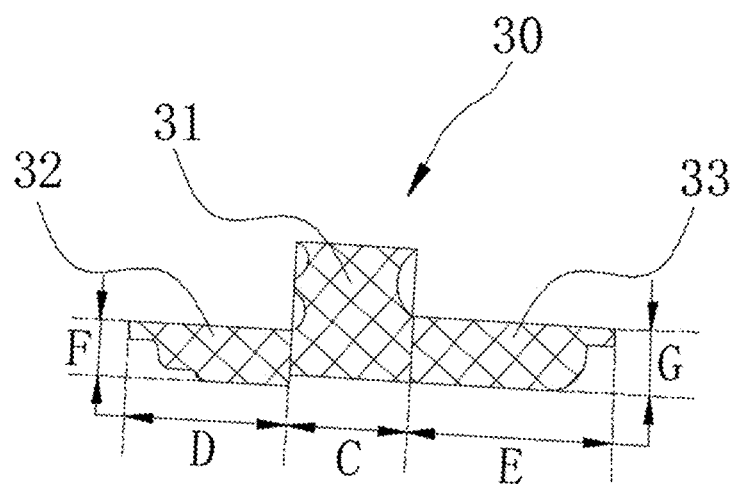
FIG. 7 is a cross-sectional view of an injection-molded connector provided in one embodiment of the present disclosure.
Figure 8:
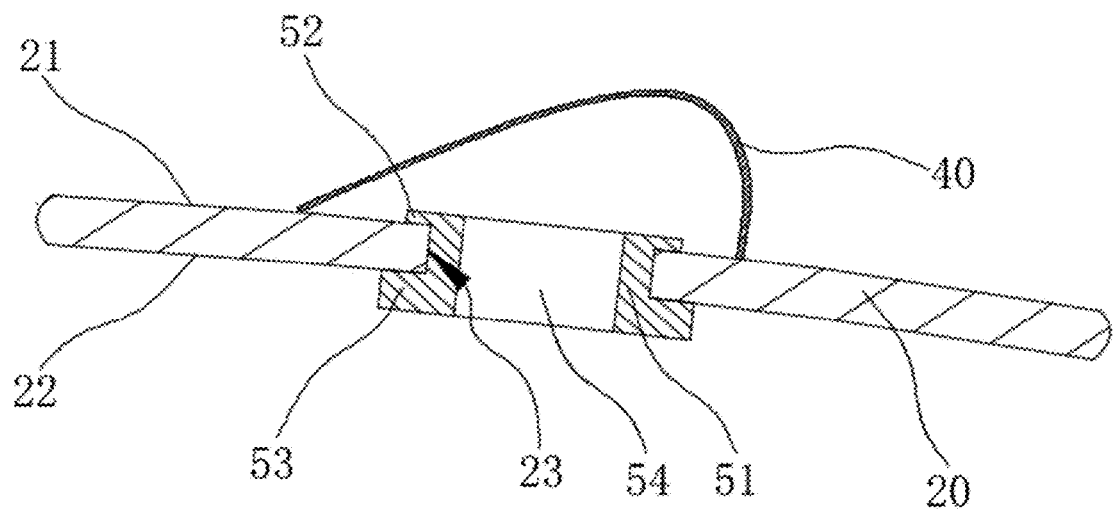
FIG. 8 is an assembly view of a second plate and a protective sleeve provided in one embodiment of the present disclosure.

Specifically, referring to FIG. 2, FIG. 5, and FIG. 7, the first connecting portion 31 has an extension length C greater than or equal to 1 mm in a direction from the first light-transmitting plate 10 to the second plate 20, so as to ensure the strength of the connecting material at the connection between the first light-transmitting plate 10 and the second plate 20, thereby enabling the connection between the first light-transmitting plate 10 and the second plate 20 to be more stable and reliable. The second connecting portion 32 has an extension length D greater than or equal to 2 mm in the direction from the first light-transmitting plate 10 to the second plate 20, so as to ensure an adhesive area between the second connecting portion 32 and the second surface 13 of the first light-transmitting plate 10, thereby ensuring the adhesive strength between the second connecting portion 32 and the first light-transmitting plate 10. The third connecting portion 33 has an extension length E greater than or equal to 2 mm in the direction from the first light-transmitting plate 10 to the second plate 20, so as to ensure an adhesive area between the third connecting portion 33 and the fourth surface 22 of the second plate 20, thereby ensuring the adhesive strength between the third connecting portion 33 and the second plate 20.

In this implementation of the present disclosure, the extension length D of the second connecting portion 32 in the direction from the first light-transmitting plate 10 to the second plate 20 is greater than or equal to 2.5 mm and less than or equal to 12 mm, so that the adhesive strength between the second connecting portion 32 and the first light-transmitting plate 10 is ensured, the material can be saved, and the weight of the vehicle window 100 can also be reduced. The extension length E of the third connecting portion 33 in the direction from the first light-transmitting plate 10 to the second plate 20 is greater than or equal to 2.5 mm and less than or equal to 12 mm, so that the adhesive strength between the third connecting portion 33 and the second plate 20 is ensured, the material can be saved, and the weight of the vehicle window 100 can also be reduced.

Referring to FIG. 2, FIG. 5, and FIG. 7, the second connecting portion 32 has an extension length F greater than or equal to 2 mm in a direction perpendicular to the second surface 13 of the first light-transmitting plate 10. When the second connecting portion 32 is fixed to the second surface 13 of the first light-transmitting plate 10, the first light-transmitting plate 10 is supported by the second connecting portion 32, so that the first light-transmitting plate 10 may not be recessed at one side of the first light-transmitting plate 10 close to the second plate 20 in the direction perpendicular to the first light-transmitting plate 10. The third connecting portion 33 has an extension length G greater than or equal to 2 mm in the direction perpendicular to the fourth surface 22 of the second plate 20. When the third connecting portion 33 is fixed to the fourth surface 22 of the second plate 20, the second plate 20 is supported by the third connecting portion 33, so that the second plate 20 may not be recessed at one side of the second plate 20 close to the first light-transmitting plate 10 in the direction perpendicular to the second plate 20.

In this embodiment of the present disclosure, the extension length F of the second connecting portion 32 in the direction perpendicular to the second surface 13 of the first light-transmitting plate 10 is greater than or equal to 2.5 mm and less than or equal to 5 mm, and the extension length G of the third connecting portion 33 in the direction perpendicular to the fourth surface 22 of the second plate 20 is greater than or equal to 2.5 mm and less than or equal to 5 mm, so that the connection strength between the first light-transmitting plate 10 and the second plate 20 is ensured, the material can be saved, and the weight of the vehicle window 100 can be reduced.

The first light-transmitting plate 10 is supported and fixed by the second connecting portion 32, and the second light-transmitting plate 20 is supported and fixed by the third connecting portion 33, so that the first light-transmitting plate 10 and the second plate 20 may not be recessed at the connection between the first light-transmitting plate 10 and the second plate 20 in the direction perpendicular to the first light-transmitting plate 10. Therefore, the first light-transmitting plate 10 and the second plate 20 are in the same plane, so as to ensure the flatness of the vehicle window 100, thereby ensuring an appearance effect of the vehicle window 100. Meanwhile, during mounting of the vehicle-mounted antenna 400, since the vehicle-mounted antenna 400 has a certain weight, the first light-transmitting plate 10 is supported and fixed by the second connecting portion 32, and the second plate 20 is supported and fixed by the third connecting portion 33, so that the second connecting portion 32 and the third connecting portion 33 have sufficient strength to support the first light-transmitting plate 10 and the second plate 20.

Referring to FIG. 1, FIG. 2, FIG. 8, and FIG. 9, the protective sleeve 50 is hollow and I-shaped, is fixedly mounted on an inner sidewall of the mounting hole 23, and at least part of an outer sidewall of the protective sleeve 50 is attached to the inner sidewall of the mounting hole 23. The protective sleeve 50 is used to protect and fix the vehicle-mounted antenna 400 and reduce collision between the vehicle-mounted antenna 400 and the second plate 20, thereby protecting the safety performance of the second plate 20.

The protective sleeve 50 includes a first protective portion 51, a second protective portion 52, and a third protective portion 53 that are integrally formed. The second protective portion 52 is disposed opposite to the third protective portion 53. The second protective portion 52 and the third protective portion 53 are fixed to the first protective portion 51 at two opposite ends of the first protective portion 51 respectively. The protective sleeve 50 defines an intermediate through-hole 54 in an axial direction of the protective sleeve 50 (extending through the second protective portion 52, the first protective portion 51, and the third protective portion 53 in sequence. The intermediate through-hole 54 is coaxial with the mounting hole 23. When the vehicle-mounted antenna 400 is mounted on the vehicle 500, the intermediate through-hole 54 is used for accommodating at least part of the vehicle-mounted antenna 400, and the protective sleeve 50 is used for fixing the vehicle-mounted antenna 400.

The first protective portion 51 is in a ring shape. An outer sidewall of the first protective portion 51 is attached to and fixedly connected to an inner sidewall of the mounting hole 23. The ring-shaped first protective portion 51 is attached to and fixedly connected to the inner sidewall of the mounting hole 23, so that the second plate 20 is prevented from being damaged due to collision between the vehicle-mounted antenna 400 and the second plate 20 during mounting of the vehicle-mounted antenna 400, thereby improving safety performance of the vehicle-mounted antenna 400 during mounting of the vehicle-mounted antenna 400.

The second protective portion 52 is in a ring shape. The second protective portion 52 is fixed to the first protective portion 51 at one end of the first protective portion 51 and extends in a radial direction of the first protective portion 51. Part of the second protective portion 52 exceeding and close to the first protective portion 51 is attached to and fixedly connected to the third surface 21 of the second plate 20. The ring-shaped second protective portion 52 is fixed to the third surface 21 of the second plate 20 to form a peripheral edge of the mounting hole 23, so that water accumulated on the third surface 21 of the second plate 20 is prevented from flowing into the mounting hole 23, thereby realizing waterproof protection on the fourth surface 22 of the second plate 20.

The third protective portion 53 is in a ring shape. The third protective portion 53 is fixed to the first protective portion 51 at the other end of the first protective portion 51 and extends in the radial direction of the first protective portion 51. Part of the third protective portion 53 exceeding and close to the first protective portion 51 is attached to and fixedly connected to the fourth surface 22 of the second plate 20. The ring-shaped third protective portion 53 is fixed to the fourth surface 22 of the second plate 20 to form a peripheral edge of the mounting hole 23, so that the second plate 20 is prevented from being damaged due to collision between the vehicle-mounted antenna 400 and the fourth surface 22 of the second plate 20 during locking of the vehicle-mounted antenna 400, thereby improving safety performance of the vehicle-mounted antenna 400 during mounting of the vehicle-mounted antenna 400.

Specifically, referring to FIG. 1, FIG. 2, FIG. 8, and FIG. 9, the first protective portion 51 has an extension length H greater than or equal to 1 mm in a radial direction of the mounting hole 23. The first protective portion 51 is configured to prevent the second plate 20 from being damaged due to the collision between the vehicle-mounted antenna 400 and the second plate 20, thereby improving the safety performance of the second plate 20.

In this embodiment of the present disclosure, the extension length H of the first protective portion 51 in the radial direction of the mounting hole 23 is greater than or equal to 2 mm and less than or equal to 5 mm, so that the safety of the first protective portion 51 is ensured when serving as an encapsulation, the material used is reduced, and the weight of parts is reduced, thereby reducing the weight of the vehicle window 100.

The second protective portion 52 has an extension length I greater than or equal to 1 mm in an axial direction of the mounting hole 23, so that a step structure is formed between one end of the second protective portion 52 away from the first protective portion 51 and the third surface 21 of the second plate 20. Therefore, the water accumulated on the third surface 21 is blocked to form a waterproof protection structure, so that the water on the third surface 21 of the second plate 20 may not flow to the fourth surface 22 of the second plate 20 through the mounting hole 23.

In this embodiment of the present disclosure, the extension length I of the second protective portion 52 in the axial direction of the mounting hole 23 is greater than or equal to 2 mm and less than or equal to 5 mm, so that a waterproof function of the second protective portion 52 is ensured, and the material used is reduced, thereby reducing the weight of the vehicle window 100.

The third protective portion 53 has an extension length J greater than or equal to 1 mm in the axial direction of the mounting hole 23, so that a step structure is formed between one end of the third protective portion 53 away from the first protective portion 51 and the fourth surface 22 of the second plate 20. Therefore, the second plate 20 is prevented from being damaged due to the collision of the vehicle-mounted antenna 400 with the fourth surface 22 of the second plate 20 during the locking of the vehicle-mounted antenna 400, so that the safety performance of the vehicle-mounted antenna 400 is better during the mounting of the vehicle-mounted antenna 400.

In this embodiment of the present disclosure, the extension length J of the third protective portion 53 in the axial direction of the mounting hole 23 is greater than or equal to 2.5 mm and less than or equal to 5 mm, so that the safety performance of the third protective portion 53 is ensured during the mounting of the vehicle-mounted antenna 400, and the material used is reduced, thereby reducing the weight of the vehicle window 100.

Regarding another embodiment provided in the present disclosure, another embodiment is substantially the same as one embodiment illustrated in FIG. 7 except for a structure of an injection-molded connector 30.

Figure 10:
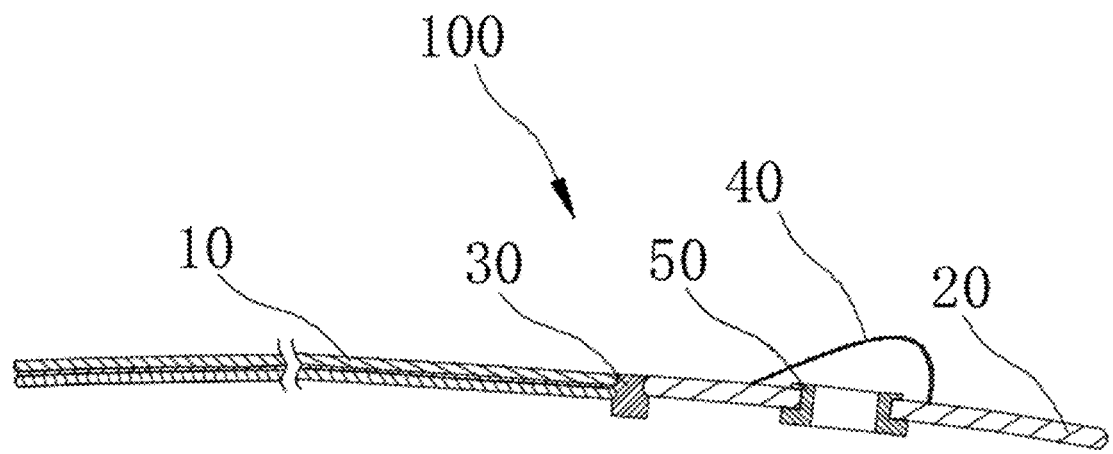
FIG. 10 is a cross-sectional view of a vehicle window provided in another embodiment of the present disclosure.
Figure 11:
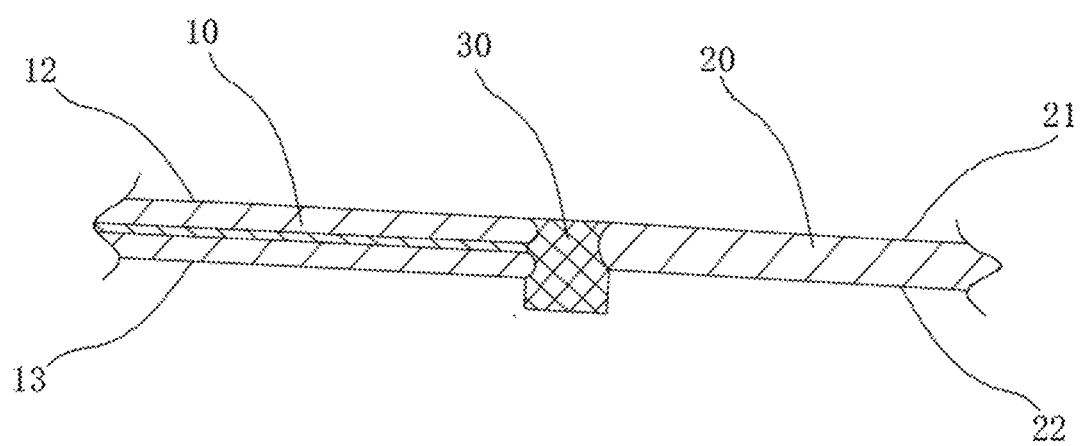
FIG. 11 is an assembly view of a first light-transmitting plate and a second plate provided in another embodiment of the present disclosure.

Compared to FIG. 7, in FIG. 10 and FIG. 11, the injection molded connector 30 is free of the second connecting portion 32 and the third connecting portion 33, and only includes the first connecting portion 31. Therefore, the material used is reduced, thereby reducing the weight of the vehicle window 100.

Figure 9:
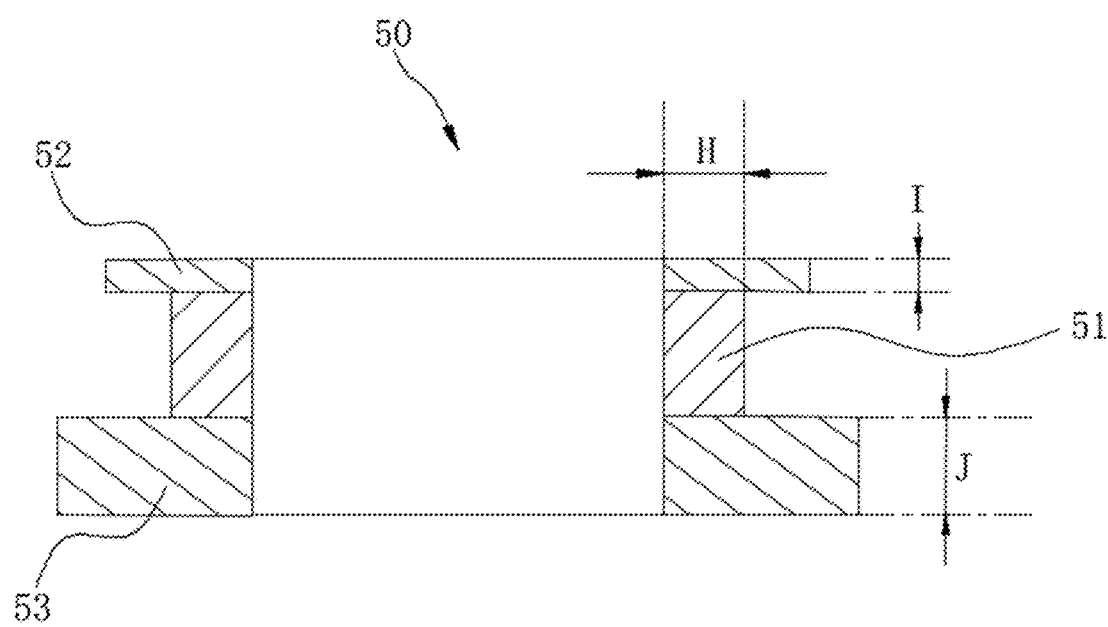
FIG. 9 is a cross-sectional view of a protective sleeve provided in one embodiment of the present disclosure.

Regarding yet another embodiment provided in the present disclosure, yet another embodiment is substantially the same as one embodiment illustrated in FIG. 9 except for a structure of a protective sleeve 50.

Figure 12:
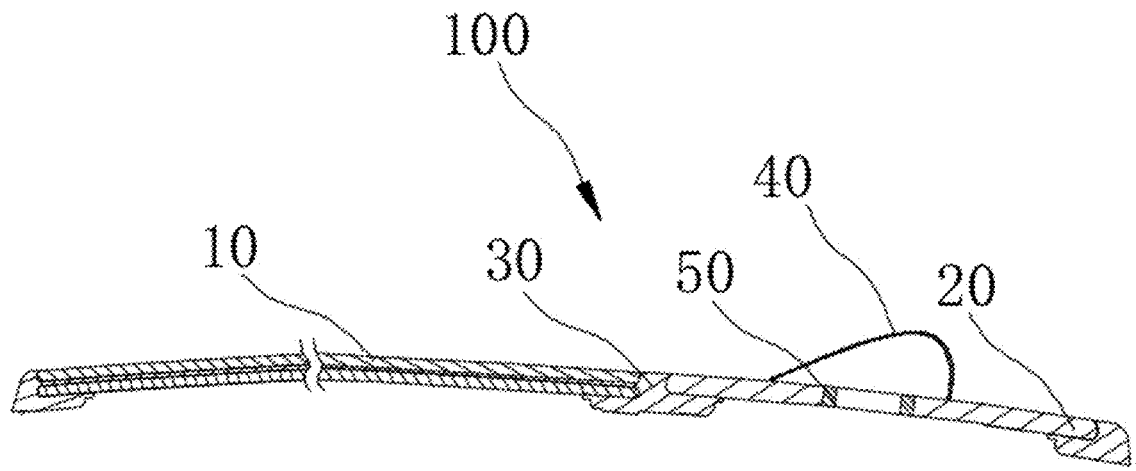
FIG. 12 is a cross-sectional view of a vehicle window provided in yet another embodiment of the present disclosure.
Figure 13:
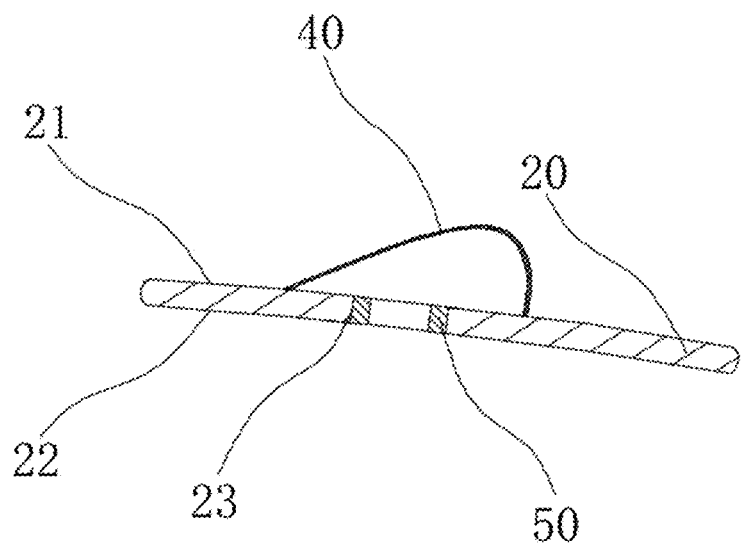
FIG. 13 is an assembly view of a second plate and a protective sleeve provided in yet another embodiment of the present disclosure.

Compared to FIG. 9, in FIG. 12 and FIG. 13, the protective sleeve 50 is free of the second protective portion 52 and the third protective portion 53, and only includes the first protective portion 51. Therefore, the material used is reduced, thereby reducing the weight of the vehicle window 100.

Regarding yet another embodiment provided in the present disclosure, yet another embodiment is substantially the same as one embodiment illustrated in FIG. 7 and FIG. 9 except for an injection-molded connector 30 and a protective sleeve 50.

Figure 14:
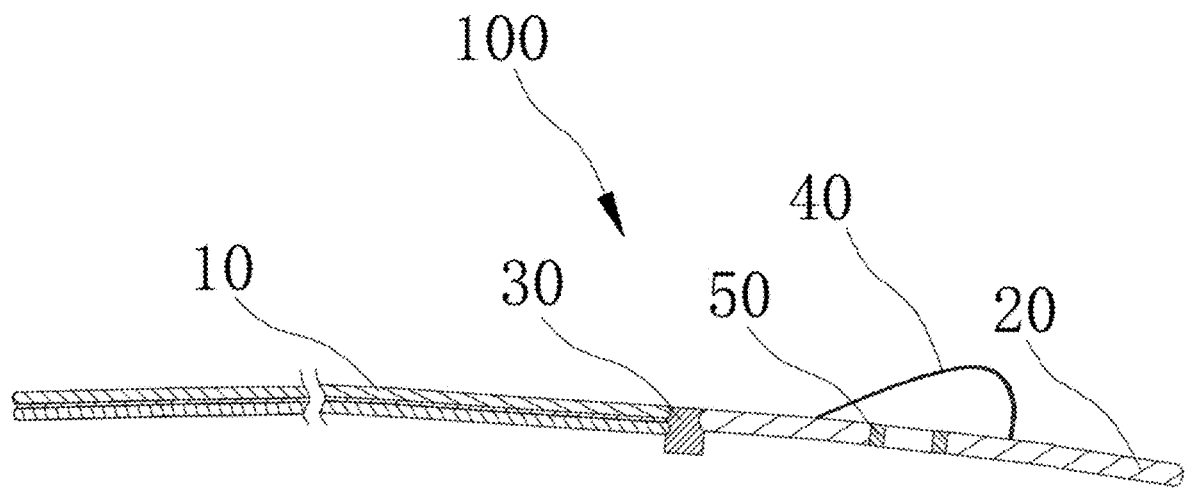
FIG. 14 is a cross-sectional view of a vehicle window provided in yet another embodiment of the present disclosure.

Compared to FIG. 7 and FIG. 9, in FIG. 14, the injection molded connector 30 is free of the second connecting portion 32 and the third connecting portion 33, and only includes the first connecting portion 31. The protective sleeve 50 is free of the second protective portion 52 and the third protective portion 53, and only includes the first protective portion 51. Therefore, the material used is reduced, thereby reducing the weight of the vehicle window 100.

The above are some implementations of the present disclosure, and it may be noted that those of ordinary skill in the art may further make improvements and modifications without departing from the principle of the present disclosure, and these improvements and modifications shall also belong to the scope of protection of the present disclosure.

What is claimed is:

1. A vehicle window, comprising:
a first light-transmitting plate;
a second plate spaced apart from the first light-transmitting plate to define a gap; wherein the second plate defines a mounting hole, the mounting hole is configured to accommodate a vehicle-mounted antenna, and the second plate is a single layer of glass; and
an injection-molded connector, disposed in the gap, and fixedly connected between the first light-transmitting plate and the second plate.

2. The vehicle window of claim 1, wherein the first light-transmitting plate has a first surface and a second surface opposite to the first surface, and the second plate has a third surface and a fourth surface opposite to the third surface; and the injection-molded connector comprises a first connecting portion, a second connecting portion, and a third connecting portion that are integrally formed, the first connecting portion is disposed in the gap, the second connecting portion is fixedly connected to the second surface, and the third connecting portion is fixedly connected to the fourth surface.

3. The vehicle window of claim 2, wherein a peripheral sidewall of the first light-transmitting plate defines an accommodating groove, the second plate is accommodated in the accommodating groove, an inner sidewall of the accommodating groove is spaced apart from the second plate to define the gap, and the first connecting portion is disposed in the gap; and the accommodating groove has a first opening located on the first surface, a second opening located on the second surface, and a third opening located on the peripheral sidewall of the first light-transmitting plate.

4. The vehicle window of claim 3, further comprising a protective sleeve fixedly penetrating through the mounting hole.

5. The vehicle window of claim 4, wherein the protective sleeve comprises a first protective portion, a second protective portion, and a third protective portion that are integrally formed; the second protective portion and the third protective portion are disposed at two opposite ends of the first protective portion respectively; and the second protective portion is fixed to the third surface, and the third protective portion is fixed to the fourth surface.

6. The vehicle window of claim 5, wherein the first protective portion has an extension thickness greater than or equal to 1 mm in a radial direction of the mounting hole, the second protective portion has an extension thickness greater than or equal to 1 mm in an axial direction of the mounting hole, and the third protective portion has an extension thickness greater than or equal to 1 mm in the axial direction of the mounting hole.

7. The vehicle window of claim 5, wherein the first protective portion is in a ring shape, and an outer sidewall of the first protective portion is attached to and fixedly connected to an inner sidewall of the mounting hole.

8. The vehicle window of claim 5, wherein the second protective portion is in a ring shape, the second protective portion is fixed to the first protective portion at one end of the first protective portion away from the third protective portion and extends in a radial direction of the first protective portion, and part of the second protective portion exceeding and close to the first protective portion is attached to and fixedly connected to the third surface of the second plate.

9. The vehicle window of claim 5, wherein the third protective portion is in a ring shape, the third protective portion is fixed to the first protective portion at one end of the first protective portion away from the second protective portion and extends in the radial direction of the first protective portion, and part of the third protective portion exceeding and close to the first protective portion is attached to and fixedly connected to the fourth surface of the second plate.

10. The vehicle window of claim 2, wherein the first connecting portion has an extension length greater than or equal to 1 mm in a direction from the first light-transmitting plate to the second plate; the second connecting portion has an extension length greater than or equal to 2 mm in the direction from the first light-transmitting plate to the second plate; and the third connecting portion has an extension length greater than or equal to 2 mm in the direction from the first light-transmitting plate to the second plate.

11. The vehicle window of claim 2, wherein the second connecting portion has an extension thickness greater than or equal to 2 mm in a direction perpendicular to the first light-transmitting plate; and the third connecting portion has an extension thickness greater than or equal to 2 mm in a direction perpendicular to the second plate.

12. The vehicle window of claim 2, wherein the first surface is connected to the third surface through the injection-molded connector, and the second surface is connected to the fourth surface through the injection-molded connector.

13. The vehicle window of claim 1, wherein the first light-transmitting plate has an extension thickness less than or equal to 5 mm in a direction perpendicular to the first light-transmitting plate.

14. The vehicle window of claim 13, wherein the first light-transmitting plate is laminated glass, the laminated glass comprises at least two layers of light-transmitting glass and at least one intermediate film, and at least one intermediate film is disposed between each two adjacent layers of light-transmitting glass in the at least two layers of light-transmitting glass.

15. The vehicle window of claim 1, wherein the second plate has an extension thickness less than or equal to 5 mm in a direction perpendicular to the second plate.

16. A vehicle, comprising a vehicle window; wherein the vehicle window comprises:
a first light-transmitting plate;
a second plate spaced apart from the first light-transmitting plate to define a gap; wherein the second plate defines a mounting hole, and the mounting hole is configured to accommodate a vehicle-mounted antenna; and
an injection-molded connector, disposed in the gap, and fixedly connected between the first light-transmitting plate and the second plate;
wherein the vehicle further comprises a vehicle-mounted antenna, a vehicle-body bracket, and an adhesive member, wherein the adhesive member is adhered between the vehicle window and the vehicle-body bracket; and the vehicle-mounted antenna penetrates through the vehicle window, and is configured to receive a high-frequency radio wave and transmit the high-frequency radio wave received to a receiver of the vehicle, to demodulate a carrier wave.

17. The vehicle of claim 16, wherein the first light-transmitting plate has a first surface and a second surface opposite to the first surface, and the second plate has a third surface and a fourth surface opposite to the third surface; and the injection-molded connector comprises a first connecting portion, a second connecting portion, and a third connecting portion that are integrally formed, the first connecting portion is disposed in the gap, the second connecting portion is fixedly connected to the second surface, and the third connecting portion is fixedly connected to the fourth surface.

18. The vehicle of claim 17, wherein a peripheral sidewall of the first light-transmitting plate defines an accommodating groove, the second plate is accommodated in the accommodating groove, an inner sidewall of the accommodating groove is spaced apart from the second plate to define the gap, and the first connecting portion is disposed in the gap; and the accommodating groove has a first opening located on the first surface, a second opening located on the second surface, and a third opening located on the peripheral sidewall of the first light-transmitting plate.

19. The vehicle of claim 17, wherein the first connecting portion has an extension length greater than or equal to 1 mm in a direction from the first light-transmitting plate to the second plate; the second connecting portion has an extension length greater than or equal to 2 mm in the direction from the first light-transmitting plate to the second plate; and the third connecting portion has an extension length greater than or equal to 2 mm in the direction from the first light-transmitting plate to the second plate.

20. The vehicle of claim 17, wherein the second connecting portion has an extension thickness greater than or equal to 2 mm in a direction perpendicular to the first light-transmitting plate; and the third connecting portion has an extension thickness greater than or equal to 2 mm in a direction perpendicular to the second plate.

* * * * *